United States Patent
Liao et al.

(10) Patent No.: US 8,355,355 B2
(45) Date of Patent: Jan. 15, 2013

(54) METHOD AND APPARATUS FOR MULTICAST GROUP MANAGEMENT

(75) Inventors: Ning Liao, Beijing (CN); Yun Tao Shi, Beijing (CN); Jun Li, Cranbury, NJ (US)

(73) Assignee: Thomson Licensing (FR)

( * ) Notice: Subject to any disclaimer, the term of this patent is extended or adjusted under 35 U.S.C. 154(b) by 78 days.

(21) Appl. No.: 12/736,909

(22) PCT Filed: May 7, 2009

(86) PCT No.: PCT/EP2009/055515
§ 371 (c)(1),
(2), (4) Date: Nov. 22, 2010

(87) PCT Pub. No.: WO2009/144125
PCT Pub. Date: Dec. 3, 2009

(65) Prior Publication Data
US 2011/0075599 A1    Mar. 31, 2011

(30) Foreign Application Priority Data
May 29, 2008    (EP) ..................................... 08305210

(51) Int. Cl.
H04W 4/06      (2009.01)
(52) U.S. Cl. .......................... 370/312; 370/390; 370/432
(58) Field of Classification Search .................. 370/312, 370/390, 338
See application file for complete search history.

(56) References Cited

U.S. PATENT DOCUMENTS

| | | | |
|---|---|---|---|
| 2003/0152098 A1* | 8/2003 | Zhu | 370/432 |
| 2006/0025181 A1 | 2/2006 | Kalofonos et al. | |
| 2007/0072604 A1* | 3/2007 | Wang | 455/428 |
| 2007/0076715 A1* | 4/2007 | Bauer et al. | 370/390 |
| 2008/0037480 A1 | 2/2008 | Venkatachalam | |

OTHER PUBLICATIONS

Liao et al., "Optimized Multicast Service Management in a Mobile WiMAX TV System", Consumer Communications and Networking Conference, Piscataway, NJ, Jan. 10, 2009, pp. 1-5.
Standard, "Internet Group Management Protocol (IGMP) / Multicast Forwarding (IGMP/MLD Proxying); rfc4605.txt", Internet Engineering Task Force, IETF, CH, Aug. 1, 2006.
Xylomenos et al., "IP Multicasting for Wireless Mobile Hosts", Conference Proceedings, IEEE, MILCOM '906, vol. 3, McLean, VA, Oct. 21-24, 1996, pp. 933-937.
Lee et al., "A MAC Layer Multicasting Approach for WiMAX Access Networks", Pervasive Computing and Communications, 2008, Sixth Annual IEEE International Conference, Mar. 17, 2008, pp. 348-353.
Search Report Dated Aug. 28, 2009.

* cited by examiner

*Primary Examiner* — Dang T Ton
*Assistant Examiner* — Pamit Kaur
(74) *Attorney, Agent, or Firm* — Jack Schwartz and Associates, PLLC (57) ABSTRACT

It provides a method for multicast group management. The apparatus determines a request for joining a multicast service derived during establishment of a connection for carrying multicast service between a first device and a second device, and it sends a message indicative of joining said multicast service based on the request for joining if the multicast service is not available in said network device. As a consequence, it reduces the messages exchanged in unreliable wireless connection so as to reduce the probability of service interruption.

5 Claims, 7 Drawing Sheets

METHOD AND APPARATUS FOR MULTICAST GROUP MANAGEMENT

This application claims the benefit, under 35 U.S.C. §365 of International Application PCT/EP2009/055515, filed May 7, 2009, which was published in accordance with PCT Article 21(2) on Dec. 3, 2009 in English and which claims the benefit of European patent application No. 08305210.0, filed May 29, 2008.

TECHNICAL FIELD

The present invention relates to data communication, and more particularly, relates to multicast group management.

BACKGROUND

The Internet Group Management Protocol (IGMP) is a communications protocol used to manage the membership of Internet Protocol multicast groups. The IGMP is used by IP hosts and adjacent multicast routers to establish multicast group memberships. As an example, when an IP host intends to join a multicast service that is corresponding to one multicast group, it uses the IGMP to join the multicast group. Furthermore, IP hosts use IGMP to report their multicast group memberships to any immediately-neighboring multicast routers. Multicast Listener Discovery (MLD) is an equivalent protocol for the host-router part in IPv6.

The report message is triggered in two cases. When the host wants to receive a multicast stream, it sends an unsolicited membership report message for joining that group to the local router. Another case is that the host generates a report message of its interested groups in response to a Query message.

The leave report message is specified by IGMPv2, which is sent by a host when it leaves a multicast group. This allows group membership termination to be quickly reported to the router.

Multicast routers use IGMP to learn which groups have members on each of their attached physical networks. The router keeps a list of multicast group membership for each attached network, and maintains the list by periodically sending host membership query messages to the all-hosts group address 224.0.0.1. If no membership report message of a specific multicast group responsive to the sent query message is received within a predetermined time, the router assumes that no host is receiving the multicast service associated with the multicast group. And as a consequence, the record of the multicast group will be deleted and the corresponding multicast packets will not be routed to the sub-network. Herein, the "multicast group membership" means the presence of at least one member of a multicast group. And the router need not keep a list of hosts that are receiving the multicast service.

A wireless communication network, such as IEEE 802.16 (WiMAX, World inter-operability for Microwave Access), can make use of IGMP to manage multicast group. However, due to such factors as time-variant fading and burst error, the air interface between the receiving device such as a Mobile Station (MS) and the access device such as a Base Station (BS) is usually unreliable. As a consequence, the IGMP related messages are lost or not correctly received, which may result in service interruption.

SUMMARY

According to an aspect of present invention, it provides a method for multicast group management in a network device. The method comprises the steps of: determining a request for joining a multicast service derived during establishment of a connection for carrying multicast service between a first device and a second device; and sending a message indicative of joining the multicast service based on said request for joining if the multicast service is not available in said network device.

According to another aspect of the present invention, it provides an apparatus for multicast group management. The apparatus comprises a transmitting module (803) and a processing module (802) configured to determine a request for joining a multicast service derived during establishment of a connection for carrying multicast service between a first device and a second device, the processing module (802) is further configured to send through said transmitting module (803) a message indicative of joining the multicast service based on the request for joining if said multicast service is not available in said network device.

According to the aspect of the present invention, due to the apparatus carries out a proxy function on behalf of the receiver device, it reduces the messages exchanged between the apparatus and the receiver device so as to reduce the probability of service interruption.

It is to be understood that both the foregoing general description and the following detailed description of the present invention are explanatory and exemplary only.

BRIEF DESCRIPTION OF THE DRAWINGS

The accompanying drawings, which are included to provide a further understanding of the invention and are incorporated in and constitute a part of this application, illustrate embodiment(s) of the invention together with the description which serves to explain the principle of the invention. Therefore, the invention is not limited to the embodiments. In the drawings.

DETAILED DESCRIPTION

The embodiment of the present invention will now be described in detail in conjunction with the drawings. In the following description, some detailed descriptions of known functions and configurations may be omitted for clarity and conciseness.

The embodiment is elaborated in a wireless communication environment. As an example, the document IEEE Std 802.16e-2005-Amendment to IEEE standard for Local and Metropolitan Area Networks—Part 16: Air Interface for Fixed Broadband Wireless Access Systems-Physical and Medium Access Control Layers for Combined Fixed and Mobile Operation in Licensed Bands, available in IEEE website, defines certain aspects of this wireless environment. The embodiment described below is placed in the framework of such environment along with the changes indicated in the description. However, the invention should not be limited to the described embodiment.

Figure 1:
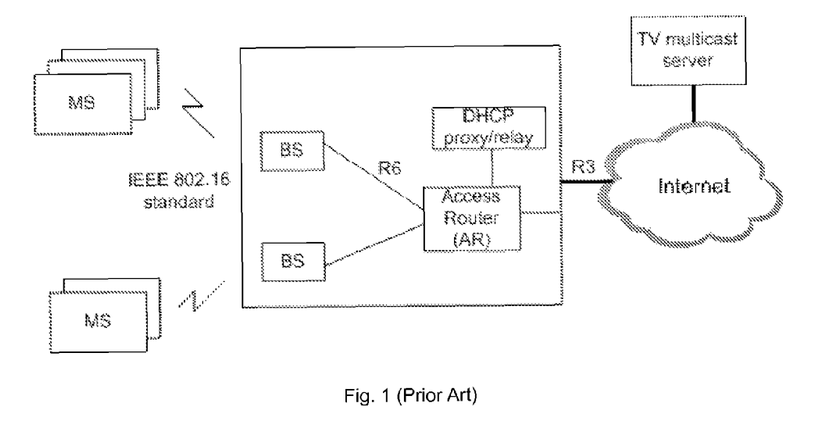
FIG. 1 is block diagram illustrating a Mobile WiMAX network for multicast service.

FIG. 1 shows a conventional Mobile WiMAX network for multicast service. The air interface between the Mobile Stations (MS) and the Base Station (BS) is specified by the IEEE 802.16 standard. Multiple BSs are connected to an access router (AR) through an R6 reference point. The AR is the gateway to the Internet. During the network entry, the MS establishes three kinds of connections in the MAC layer with the BS, bidirectional Basic Connection, Primary Connection and Secondary Connection, which are used for the transmission of urgent MAC-layer management messages, non-urgent MAC-layer management messages, and IP protocols respectively. When the MS requests to join a multicast service provided by the TV multicast server, it sends an IGMP report (join) message to the multicast group of the multicast service.

Figure 2:
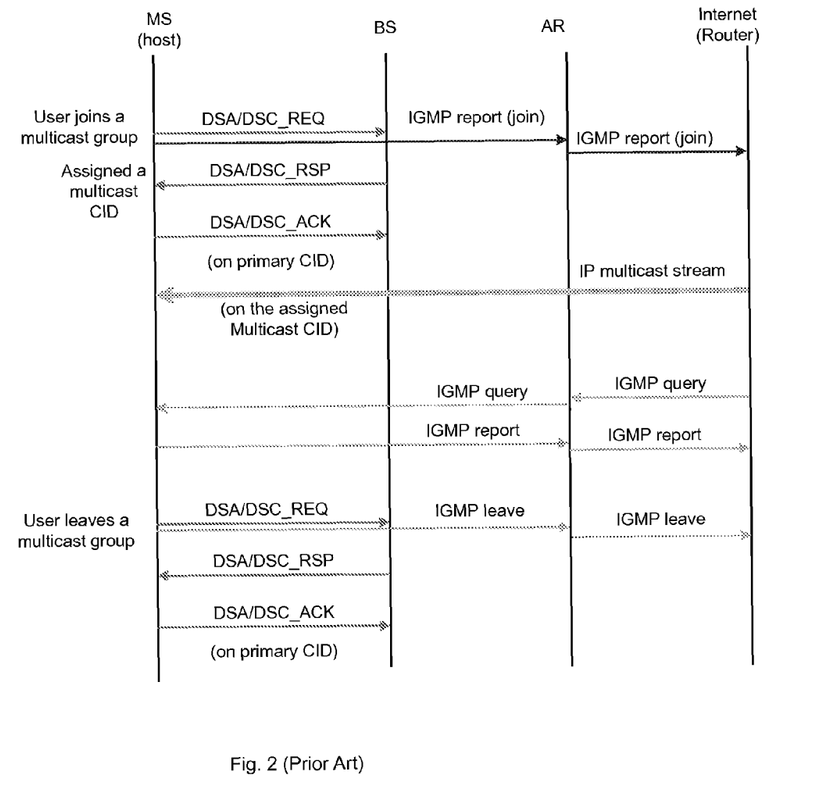
FIG. 2 is a message sequence chart illustrating a conventional method for managing multicast group.

IP multicast in a Mobile WiMAX network involves both MAC-layer and session-layer multicast management. As shown in FIG. 2 a message sequence chart illustrates a conventional method for managing multicast group when providing multicast service. In order to receive a TV program, in addition to sending the IGMP report (join) messages, the MS should first establish an MBS (Multicast and Broadcast Service) connection identified by a unique connection ID (CID) via three-way Dynamic Service Addition (DSA) procedure at the MAC-layer. Because the WiMAX network is connection-oriented, a MAC-layer connection must be established. The unique CID, different from the hardware MAC address, is used in the IEEE802.16 MAC PDU header to differentiate the service flows at the MAC layer level. The connection is established, modified and deleted via Dynamic Service Addition (DSA), Dynamic Service Change (DSC), and Dynamic Service Deletion (DSD) management messages.

Besides the service interruption problem caused by the unreliable transmission in the air interface between the MS and the BS, there are two more drawbacks in the conventional Mobile WiMAX communication system employing IGMP to provide the multicast service.

(1) The Interruption of the Sleep Mode of a MS:

The membership query message is sent through the broadcast connection because it is directed to the all-hosts group address 224.0.0.1, to which all MSs listen to. As a result, those MSs that do not belong to the queried multicast group are forced to wake up from the Sleep Mode to receive data on the Broadcast Connection. The same interruption also happens to the MSs that are a member of the queried group, if the MS is receiving the multicast streams it is interested in on the corresponding multicast connections in a power saving manner.

(2) Overhead of a Large Amount of IGMP Membership Report Messages from the MSs

Bandwidth is an especially precious resource in the wireless network. No matter how the report suppression mechanism is implemented as in IGMPv1/2 or cancelled in IGMPv3, membership report messages in response to a query message will consume a non-negligible part of the bandwidth.

Figure 3:
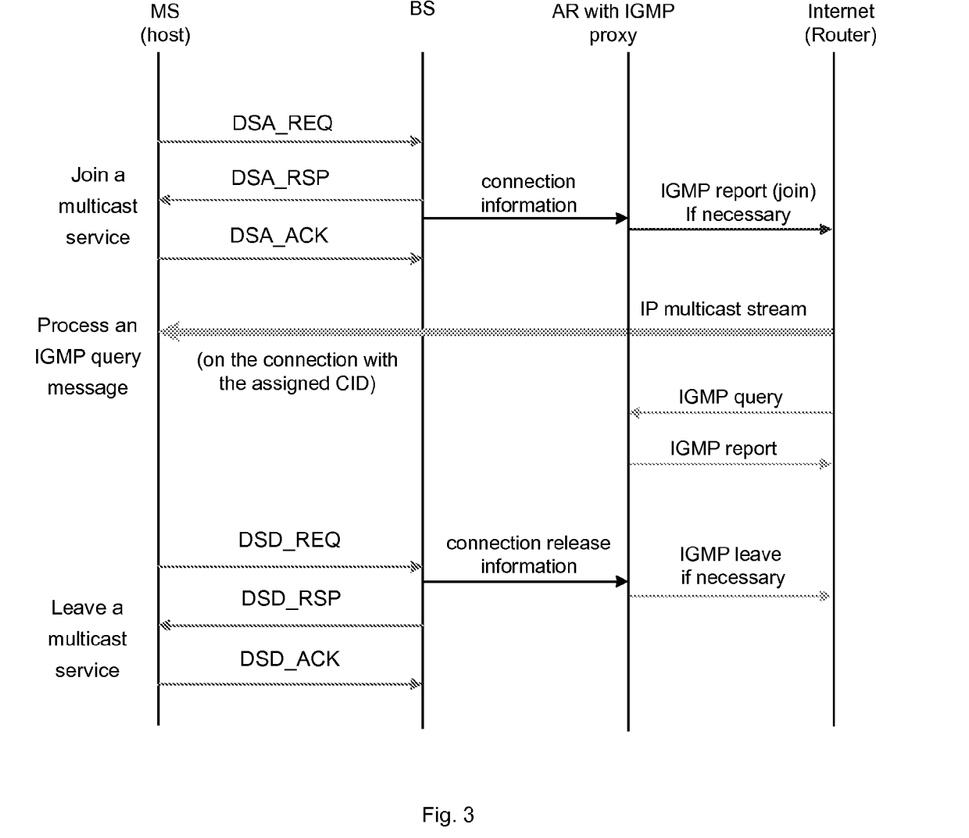
FIG. 3 is a message sequence chart illustrating a method for managing multicast group according to the embodiment of the present invention.

The FIG. 3 is a message sequence chart illustrating a method for managing multicast group in accordance with the present embodiment. The IGMP deployed in the AR carries out a proxy function on behalf of MS(s) connected to the AR at the time, for example, when MS intends to join a multicast service, respond to a query message or leave a multicast service. The procedures of joining a multicast service, processing an IGMP query message and leaving a multicast service are described in detail below.

1. Joining a Multicast Service:

The MS requesting to join a multicast service initiates a DSA/DSC request to establish a MAC-layer connection and gets a multicast CID for traffic transport. During the establishment of the MAC-layer connection via DSA procedure, some information used to indicate which multicast service the MS intends to join is transmitted from the MS to the BS. After establishing the connection, the BS sends a message containing the connection information, which is derived during the establishment of the connection via DSA procedure between the MS and the BS, to the IGMP proxy. Herein, the IGMP proxy maintains a multicast group membership list based on the connection information received from the BS. The IGMP proxy directly sends the IGMP report (join) to the upstream multicast router if the requested multicast service is not available in the AR. It is unnecessary for the IGMP proxy to send the IGMP report (join) message if the requested multicast service is available in the AR. As a consequence, due to the instruction of MS's requesting to join a multicast service is implicitly transmitted in the MAC layer, the transmission is more reliable and faster than transmitted in the upper layer. Furthermore, IGMP proxy initially generates and sends the IGMP join message on behalf of the MS to the upstream router so as to reduce the probability of service interruption caused by exchanging IGMP join message on unreliable wireless connection.

This paragraph gives an example of the connection information. During the establishment of the connection via the DSA procedure, a set of CS (convergence sub-layer) parameters (i.e. classification rules) are included in the DSA messages. The CS parameters may include IP source address, IP source port, IP destination address, IP destination port, priority class, Ethernet address, IP protocol etc. . . . In the present embodiment, as an example, the multicast group IP address is included in DSA messages. The multicast IP address can uniquely identify a multicast service. The connection information in this embodiment comprises the multicast group IP address and the MS identifier used to uniquely identify the MS. As an example, the MS identifying information is the IP address of the MS or the MAC address of the MS, which is known to the BS when the MS performs the network entry procedure. The multicast group IP address is called 'GroupAddr' for convenience in the following description. Once the multicast connection with a unique CID is established in the MAC layer, the mapping between the MS identifier and the GroupAddr is established for the MS requesting to join the multicast service. The mapping information is stored in the membership management table also by the IGMP proxy. As an example, the membership management table contains the fields of GroupAddr and the MS identifier.

Figure 4:
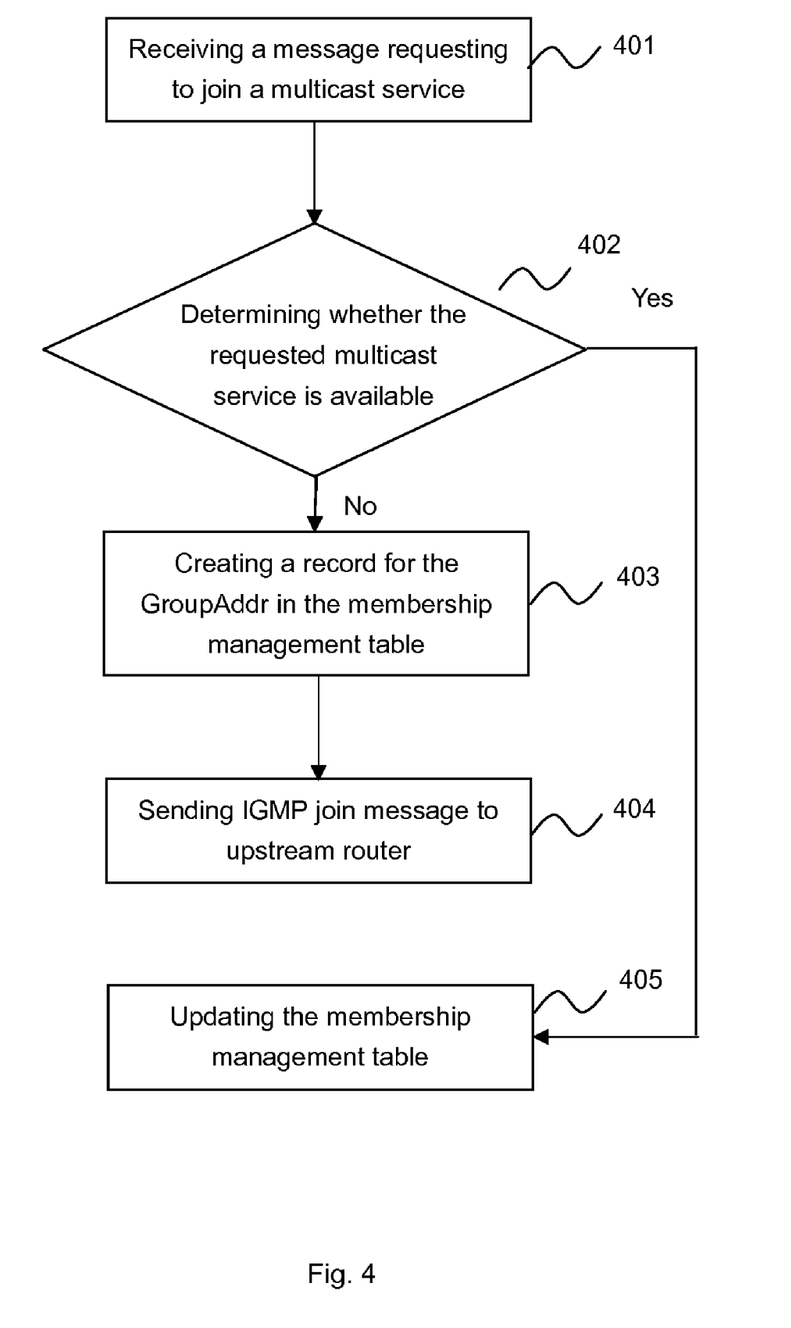
FIG. 4 is a flowchart illustrating the work flow of IGMP proxy when requesting to join a multicast service according to the embodiment of the present invention.

FIG. 4 is a flowchart illustrating the work flow of the IGMP proxy when requesting to join a multicast service according to the embodiment.

Step 401: the IGMP proxy deployed in the AR receives a message requesting to join a multicast service triggered by the MAC-layer join event (such as DSA/DSC to activate an MBS service flow), where the message contains the connection information. "Trigger" here means: once an MAC-layer join event happens, the GroupAddr is transmitted in the DSA/DSC related messages from the MS to the BS, and then the BS derives the connection information and sends it to the IGMP proxy.

Step 402: the IGMP proxy determines whether the requested multicast service is available in the AR by determines whether the GroupAddr derived from the connection information has an entry in the membership management table. If the GroupAddr exists in the table, then it goes to the Step 405, or it goes to Step 403.

Step 403: the IGMP proxy creates a record for the GroupAddr in the membership management table.

Step 404: the IGMP proxy sends to the upstream multicast router an IGMP join message containing the GroupAddr indicative of joining the requested multicast service.

Step 405: the IGMP proxy updates the membership management table. The requested multicast service is available, which means at least one other MS is receiving the requested multicast service, so the IGMP proxy should update the membership management table to add the information on the MS identifier and the relationship of the MS identifier and the GroupAddr of the requested multicast service.

2. Processing an IGMP Query Message:

When receiving an IGMP query message from an upstream multicast router, the IGMP proxy does not forward it to the wireless sub-network as in the conventional solution, but instead responds directly based on the membership management table. As a consequence, IGMP proxy initially generates and sends the IGMP response message on behalf of the MS so as to reduce the probability of service interruption caused by exchanging IGMP messages between the MS and the BS on unreliable wireless connection. Furthermore, due to the IGMP query message is terminated in the IGMP proxy without forwarding to the MSs, it will not cause any unnecessary interruption of the power saving mode and will save radio resource.

Figure 5:
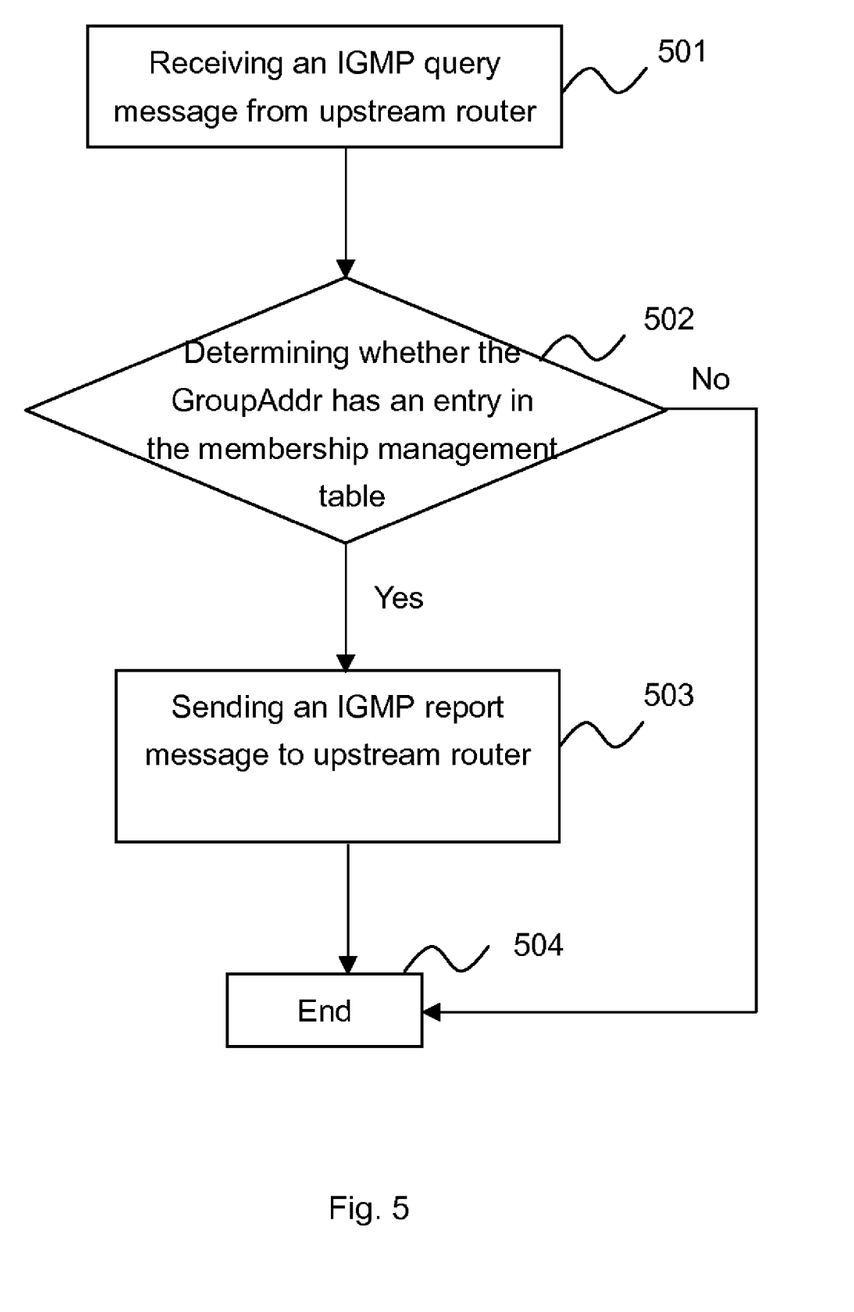
FIG. 5 is a flowchart illustrating the work flow of IGMP proxy when processing the IGMP query message from the upstream multicast router according to the embodiment of the present invention.

FIG. 5 is a flowchart illustrating the work flow of IGMP proxy when processing the IGMP query message from the upstream multicast router according to the embodiment of the present invention.

Step 501: the IGMP proxy receives an IGMP query message containing the GroupAddr from the upstream router. The query message is used to query if there is any MS receiving the multicast service identified by the GroupAddr contained in the query message.

Step 502: the IGMP proxy determines whether the GroupAddr derived from the IGMP query message has an entry in the membership management table. If the GroupAddr derived from the IGMP query message exists in the table, it goes to the step 503, or otherwise, it goes to the step 504.

Step 503: the IGMP proxy sends to the upstream multicast router an IGMP report message indicating the multicast service associated with the GroupAddr is being received by at least one MS.

Step 504: the IGMP proxy ends the flow without forwarding the IGMP query message to the sub-network.

3. Leaving a Multicast Service:

When the MS leaves the multicast service, it initiates a DSD/DSC request to release the corresponding multicast connection. During the procedure of connection release, GroupAddr is transmitted from the MS to the BS in the MAC layer. As shown in the FIG. 3 that the IGMP proxy is deployed in the AR, the connection information containing the GroupAddr and of the MS identifier of the MS that leaves the multicast service will be sent from the BS to the AR. So the membership management table maintained by the IGMP proxy is updated based on the received connection information. The IGMP proxy sends an IGMP leave message based on the membership management table, if necessary, on behalf of the MS. As a consequence, due to the instruction of MS's requesting to leave a multicast service is implicitly transmitted in the MAC layer, the transmission is more reliable and faster than transmitted in the upper layer. Furthermore, IGMP proxy initially generates and sends the IGMP leave message on behalf of the MS to the upstream router so as to reduce the probability of service interruption caused by exchanging IGMP leave message on unreliable wireless connection.

Figure 6:
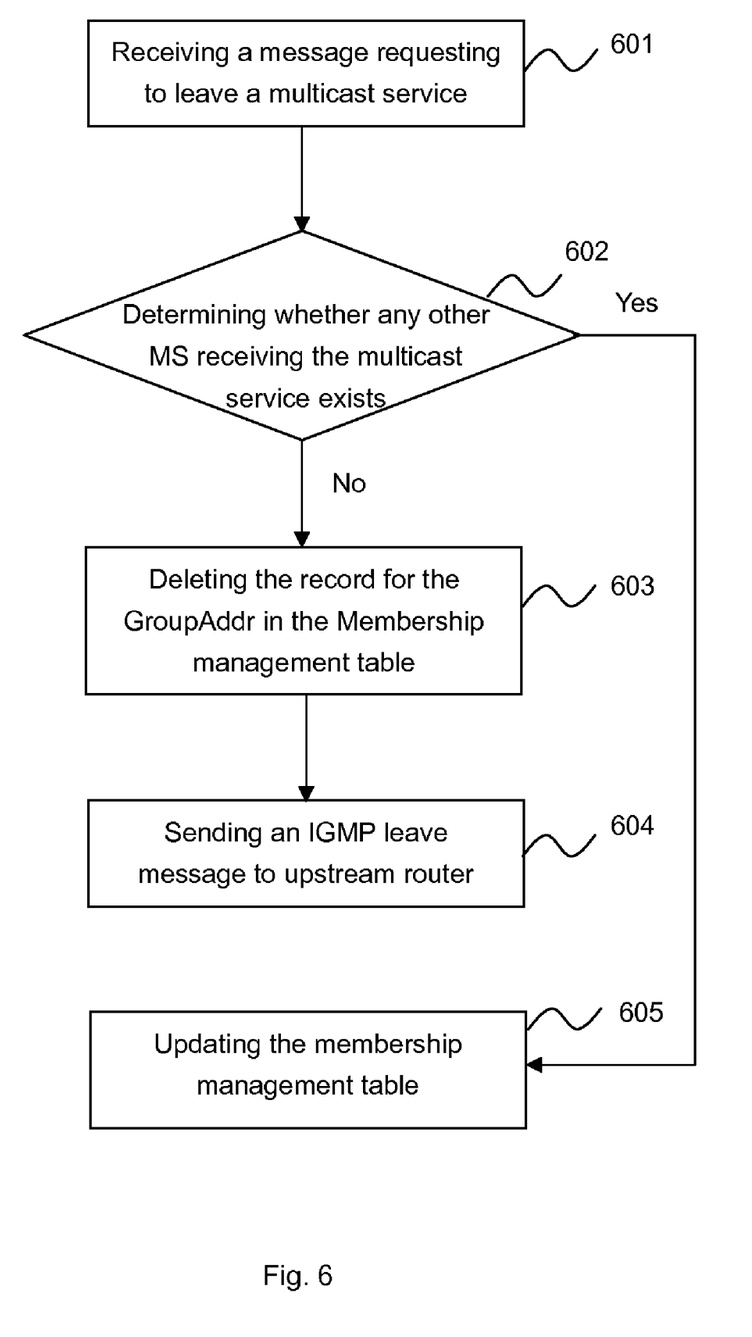
FIG. 6 is a flowchart illustrating the work flow of IGMP proxy when requesting to leave a multicast service according to the embodiment of the present invention.

FIG. 6 is a flowchart illustrating the work flow of the IGMP proxy when requesting to leave a multicast service according to the embodiment of the present invention.

Step 601: the IGMP proxy receives a message requesting to leave a multicast service triggered by the MAC-layer leave event (such as DSD/DSC to deactivate or delete an MBS service flow).

Step 602: the IGMP proxy determines whether any other MS besides the MS that requests to leave the multicast service is receiving the multicast service based on the membership management table. As an example, the IGMP proxy firstly derives the GroupAddr from the message received in the step 601, then uses the derived GroupAddr to find the entry in the membership management table, and finally determines whether there are any other MS associated with the GroupAddr. If any other MS exists, then it goes to the step 605, or it goes to the step 603.

Step 603: the IGMP proxy deletes the record for the GroupAddr in the membership management table.

Step 604: the IGMP proxy sends an IGMP leave message containing the GroupAddr to the upstream multicast router.

Step 605: the IGMP proxy updates the membership management table. Herein, the IGMP proxy should update the membership management table to remove the information on the MS identifier and the relationship between the MS identifier and the GroupAddr uniquely identifying the multicast service requested to leave, but should leave the GroupAddr in the table.

According to the present embodiment, the membership management table contains two fields. The GroupAddr takes up one field, and the other field is used to contain one or more MS identifiers of the MS that are receiving the same multicast service. Therefore, a combination of GroupAddr and MS identifiers makes up a record. However, according to a variant of the present embodiment, the other field only contains a single MS identifier. So a record is made up of a GroupAddr and a single MS identifier. According to another variant of the present embodiment, the other field is used to record the number of the MS(s) receiving the same multicast service other than the MS identifier.

Moreover, the MS regularly detects the status of the multicast service in the upper layer of the MAC layer, such as the application layer, by detecting the status of the UDP socket. In case that the application in the application layer is terminated exceptionally without triggering the message to tear down the multicast connection between the BS and the MS, the MS can detect this and initiate the connection deletion procedure in the MAC layer by sending the DSC/DSD_REQ message.

Furthermore, the BS is configured to detect the exceptional power down or death of the MS by employing periodically a ranging technique and then requesting the IGMP proxy to update the membership management table correspondingly.

Figure 7:
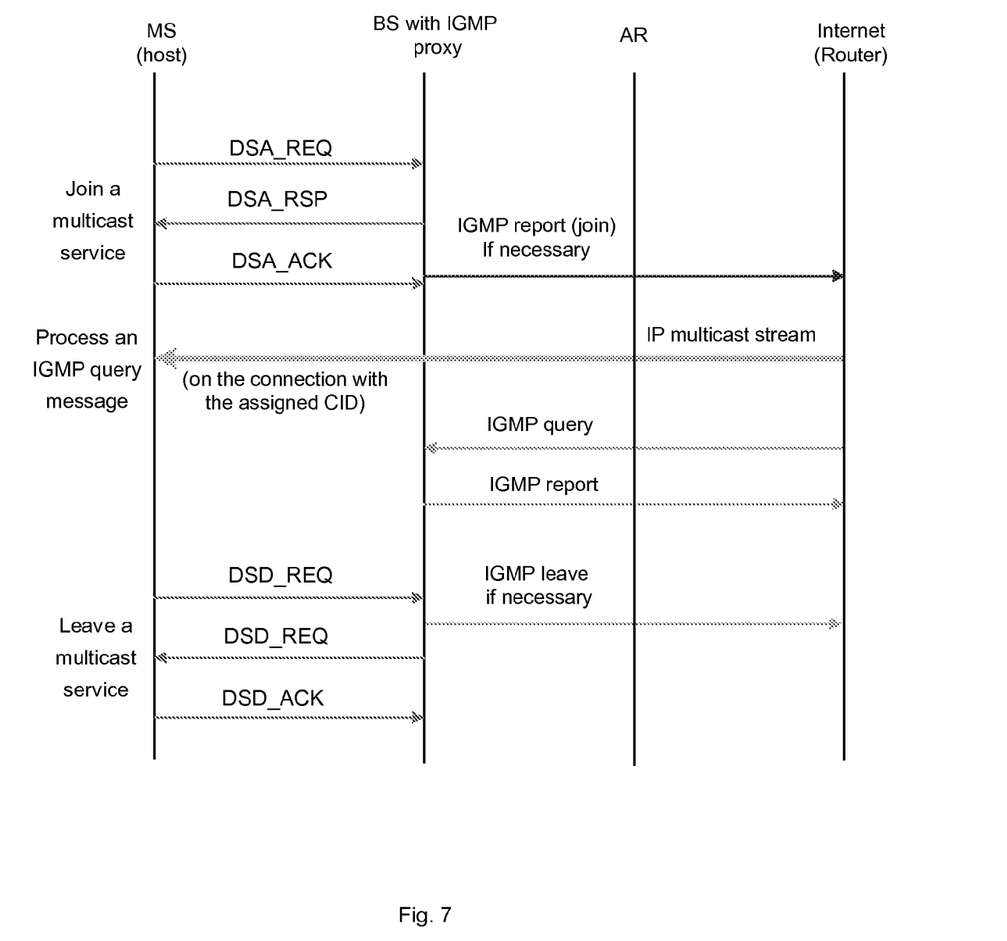
FIG. 7 is a message sequence chart illustrating another method for managing multicast group according to the variant of the embodiment.

According to a variant of the present embodiment, the IGMP proxy is deployed in the BS instead of the AR. Therefore, there is no need for the BS to transmit the connection information to the AR. As shown in FIG. 7, if the IGMP proxy is deployed in the BS, the transmission of connection information from the BS to the IGMP proxy is redundant. Furthermore, the message requesting to join/leave a multicast service in steps 401 and 601 should not be limited the message explicitly received from other device. As an example, the DSA/DSC/DSD related message that is used to derive the connection information can be deemed as message that implicitly requesting to join/leave a multicast service.

According to a variant of the present embodiment, the operating step on the membership management table, such as creating step 403, updating steps 405, 605 and deleting step 603, is not performed by the IGMP proxy, but by another device that is in signal communication with the IGMP proxy. For example, if the IGMP proxy is deployed in the AR, the operation of the membership management table is performed by the BS.

According to a variant of the present embodiment, the method/apparatus is not limited to WiMAX. The method can be applied to other communication systems facing the same or similar problem.

According to a variant of the present embodiment, the method can be applied to MLD in IPv6 to solve a similar problem.

Figure 8:
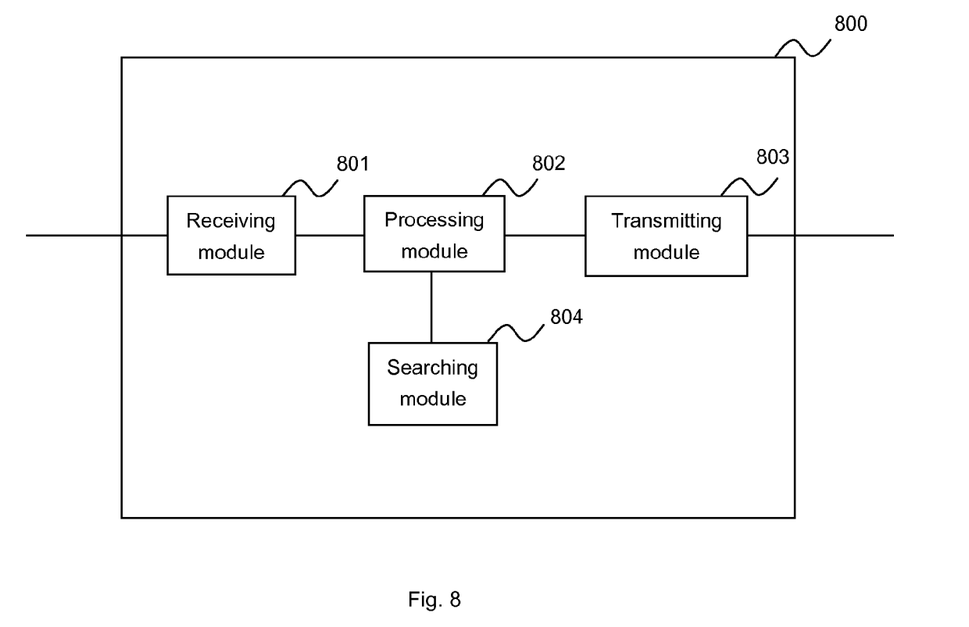
FIG. 8 a block diagram of the IGMP proxy according to the embodiment of the present invention.

According to the embodiment of the invention, as shown in FIG. 8, the IGMP proxy 800 comprises a receiving module 801, a processing module 802, a transmitting module 803 and a searching module 804.

The receiving module 801 is configured to receive message;

The transmitting module 803 is configured to send message;

The searching module 804 is configured to search the mapping information database with at least one inputted search criterion or keyword;

The processing module 802 is configured to carry out proxy functions through handling IGMP related messages based on search result gotten from the searching module with the input of information derived from the message received by the receiving module 801. To be specific, it is configured to:

(1) derive the GroupAddr from the message requesting to join a multicast service received by the receiving module 801, use the GroupAddr as an input to the searching module 804 to get a search result, and then determine whether the requested multicast service is available in the device where the IGMP proxy is deployed by determining whether the GroupAddr has an entry in the mapping information database based on the search result. If not available, the processing module 802 will invoke the transmitting module 803 to send another message containing the GroupAddr indicative of joining the multicast service.

(2) derive the GroupAddr from a IGMP query message received by the receiving module 801, make use of the searching module 804 to determining whether the GroupAddr has an entry in the mapping information database with the GroupAddr as an input. If an entry exists, the processing module 802 invokes the transmitting module to send a response message responsive to the query message without forwarding the query message to the MS. If an entry does not exist, the processing module 802 discards the query message.

(3) derive the GroupAddr from the message requesting to leave a multicast service received by the receiving module 801, use the GroupAddr as an input to the searching module 804 to get a search result, and then determine whether any other MS besides the MS requesting to leave is receiving the multicast service by determining whether the GroupAddr has at least one more entry besides the one associated the MS requesting to leave in the mapping information database based on the search result. If not exist, the processing module 802 will invoke the transmitting module 803 to send another message containing the GroupAddr indicative of leaving the multicast service.

The IGMP proxy further comprises an updating module (not shown in the figure) configured to update the mapping information database when the receiving device joins leaves or changes a multicast service.

Furthermore, the mapping information database is a part of IGMP proxy, or stored in a device that is in signal communication with the IGMP proxy. As an example, the mapping information database is in the form of the table as described above.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the invention.

What is claimed is:

1. A method for multicast group management in a network device, wherein, when a mobile station intends to join a multicast service, the method comprises at the side of the network device, the steps of:
   establishing a MAC layer connection between the mobile station and the network device in response to receipt of a request for establishing the MAC layer connection from the mobile station, wherein, during the establishment of the MAC layer connection, determining a multicast service identifier uniquely indicating the multicast service and a mobile station identifier uniquely identifying the mobile station that are conveyed in convergence sub-layer parameters;
   creating a record indicating the relationship between the multicast service and the mobile station;
   sending an IGMP message indicative of joining said multicast service if said multicast service is not available in said network device; and
   carrying out a proxy function on behalf of the mobile station based on the record.

2. The method according to the claim 1, wherein, when the mobile station intends to leave the multicast service, the method further comprises:
   releasing the MAC layer connection in response to receipt of a request to release the MAC layer connection, wherein, during the establishment of the MAC layer connection, determining the multicast service identifier uniquely indicating the multicast service and the mobile station identifier is inserted thereof uniquely identifying the mobile station that are conveyed in convergence sub-layer parameters;
   sending an IGMP message indicative of leaving said multicast service if said mobile station is the only one receiving said multicast service through said network device.

3. The method according to the claim 1, wherein it further comprising, the network device detects the exceptional power down or death of the mobile station and requests the record to be updated accordingly.

4. An apparatus for multicast group management, comprising a transmitting module, wherein it further comprising,
a database;
a processing module configured to establish a MAC layer connection between a mobile station and the apparatus in response to receipt of a request for establishing the MAC layer connection from the mobile station; to determine, during the establishment of the MAC layer connection, a multicast service identifier uniquely indicating a multicast service that the mobile station intends to join and a mobile station identifier uniquely identifying the mobile station, wherein the multicast service identifier and the mobile station identifier are conveyed in convergence sub-layer parameters; to creating in the database a record indicating the relationship between the multicast service and the mobile station; to send through said transmitting module an IGMP message indicative of joining said multicast service if said multicast service is not available in said apparatus; and to carry out a proxy function on behalf of the mobile station based on the record.

5. The apparatus according to the claim 4, wherein said processing module is further configured to release the MAC layer connection in response to receipt of a request to release the MAC layer connection; to determining, during the establishment of the MAC layer connection, a multicast service identifier uniquely indicating the multicast service that the mobile station intends to leave and a mobile station identifier uniquely identifying the mobile station, wherein the multicast service identifier and the mobile station identifier are conveyed in convergence sub-layer parameters; and to send an IGMP message indicative of leaving said multicast service if said mobile station is the only one receiving said multicast service through said apparatus.

* * * * *